United States Patent [19]

Ueda et al.

[11] Patent Number: 4,980,771

[45] Date of Patent: Dec. 25, 1990

[54] IMAGING DEVICE AND IMAGING APPARATUS INCLUDING THE IMAGING DEVICE

[75] Inventors: Kazuhiko Ueda; Isao Namae, both of Yokohama, Japan

[73] Assignee: Victor Company of Japan, Ltd., Japan

[21] Appl. No.: 312,102

[22] Filed: Feb. 17, 1989

[30] Foreign Application Priority Data

Feb. 18, 1988 [JP] Japan .................................. 63-36385
May 20, 1988 [JP] Japan ................................ 63-123344

[51] Int. Cl.$^5$ ............................................. H04N 3/14
[52] U.S. Cl. ............................ 358/213.28; 358/213.19
[58] Field of Search ...................... 358/213.13, 213.19, 358/213.28, 105, 213.26

[56] References Cited

U.S. PATENT DOCUMENTS

| | | | |
|---|---|---|---|
| 3,851,096 | 11/1974 | Collins et al. | 358/213.28 |
| 4,038,690 | 7/1977 | Hoagland | 358/213.28 |
| 4,551,758 | 11/1985 | Masunaga et al. | 358/213.19 |
| 4,663,669 | 5/1987 | Kinoshita et al. | 358/213.19 |
| 4,744,057 | 5/1988 | Descure et al. | 358/213.19 |

Primary Examiner—Stephen Brinich
Attorney, Agent, or Firm—Lowe, Price, LeBlanc, Becker & Shur

[57] ABSTRACT

The invention discloses techniques suited for extracting image from detected image. First device is a CCD imager having two horizontal CCDs, driven separately, arranged in the vertical direction along vertical CCDs thereof. Further, it has initialize means for releasing all charges in the outer horizontal CCD at once in response to first external signal. First apparatus comprises first device and controller for producing horizontal drive pulses, the number of pulses for the inner horizontal CCD being determined by second external signal. Second device has two CCD imagers driven separately, arranged in main scanning direction, forming one imaging plane. Second apparatus comprises second device; second controller for producing driving pulses at such timing that image signals from these imagers are formed into a one-scan-line image signal which is longer than a horizontal scanning interval, with a variable phase with a horizontal blanking signal; and a switch for transferring these image signals only for horizontal scanning period. The variable phase is determined by third external signal. Third apparatus comprises first or second apparatus wherein the controller further has a circuit for producing vertical transfer pulses wherein high speed transfer pulses are provided before beginning of normal transfer pulses. The number of high speed pulses is determined by fourth external signal. Fourth apparatus comprises first, second, or third apparatus and a moving detector for detecting movement of detected images over two fields for cancelling the movement on displayed image, which utilizes field correlation and for outputting these external signals.

16 Claims, 16 Drawing Sheets

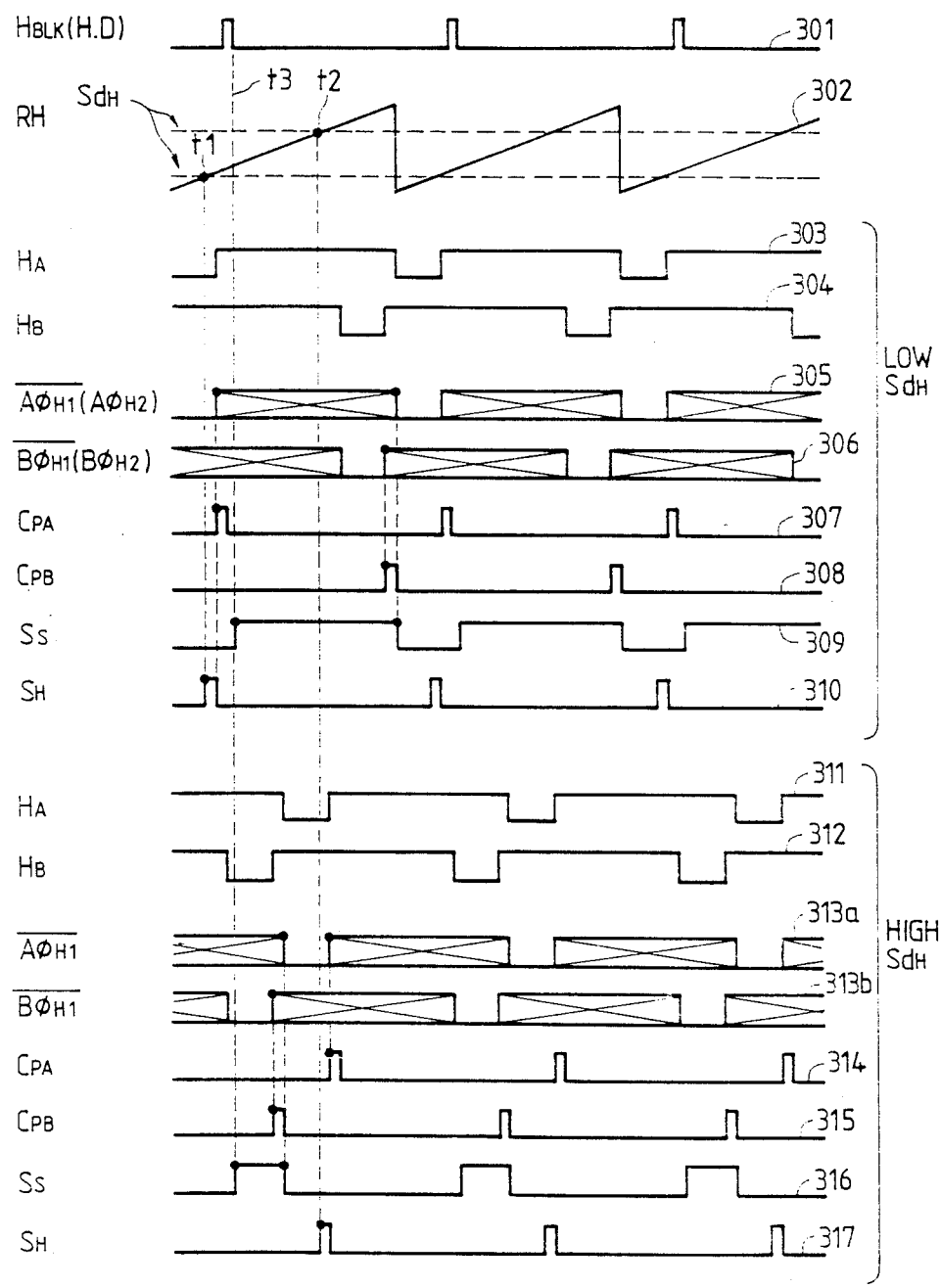

A    a(1) ---- a(20)

B    b(1) ---- b(20)

| A | a(1) ----- a(5) | a(6) ---- a(15) | a(16) ---- a(20) |
|---|---|---|---|
| B | b(1) ---- b(5) | b(6) ---- b(15) | b(16) ---- b(20) |

IMAGING DEVICE AND IMAGING APPARATUS INCLUDING THE IMAGING DEVICE

BACKGROUND OF THE INVENTION

1. Field of the Invention

This invention relates generally to an imaging device and imaging apparatus and more particularly, the invention relates to an imaging apparatus suited for extracting a part of detected image and to an imaging device used in this imaging apparatus.

2. Description of the Prior Art

The main types of imaging apparatus used for image processing with extraction of a part of the detected image, as shown in FIG. 7, comprise an imaging device having a broader image detecting area than the image area to be extracted, a digital frame memory storing an image signal from this imaging device through an A/D converter, and reading means for reading the stored image signal. The signal of the whole imaging area is read out and sent to the A/D converter. The digital frame memory stores a signal from the A/D converter. An image signal of a desired image area, i.e., of an extracted image area is obtained by applying beginning address data of the desired image area to the memory controller.

However, in such imaging apparatus, there is a drawback in that the reading speed of the imaging device becomes too high because the above-mentioned processing, i.e., reading out from the imaging device and storing of data, should have been done for a time period from a horizontal blanking period to reading out of the stored image data; the image signal should be read out from the imaging device at least at k/m times the standard reading speed of NTSC, wherein "k" is the number of pixels of the imaging device in the horizontal direction and "m" is that of image area extracted. There is also a drawback in that the fast reading speed results in a deterioration of picture quality. Further, the necessity of an A/D converter and a frame memory increases the cost.

Other types of imaging apparatus used for image processing with extraction of a part of the detected image only in horizontal direction, as shown in FIG. 7, comprises a CCD imaging device and reading means. The reading means reads image signal of a non-extracted area at high speed for a horizontal blanking period, then it reads image signal of the image area to be extracted at the standard speed. The image signal of the non-extracted area is not used. The imaging apparatus outputs only image signal of the extracted image area.

However, in such imaging apparatus, there is a drawback in that the reading speed for a horizontal blanking period becomes too high because this type of continuously-reading-out type of imaging apparatus, for example, a CCD imaging device requires a higher transfer speed of reading in the horizontal direction than that in the vertical direction. Therefore, it is difficult in extraction of image according to the above-mentioned construction.

SUMMARY OF THE INVENTION

The present invention has been developed in order to remove the above-described drawbacks inherent to the conventional interline type CCD imaging device and imaging apparatus including this interline type CCD imaging device.

It is, therefore, an object of the present invention to provide a new and useful imaging device and imaging apparatus including the imaging device.

According to a feature of the present invention there is provided a first imaging device comprising: plural vertical CCDs arranged in main scanning direction; photoelectic conversion elements arranged along each of said plural vertical CCDs; transfer means for transferring charges generated in each of said photoelectric conversion elements to said plural vertical CCDs in response to a vertical blanking signal; a first horizontal CCD arranged along an end of said plural vertical CCDs for receiving said charges from said plural vertical CCDs in response to a first signal and for transferring said charges in said main scanning direction in response to a second signal; a second horizontal CCD interposed between said plural vertical CCDs and said first horizontal CCD for receiving said charges from said plural vertical CCDs in response to a first signal and for transferring said charges in said main scanning direction in response to a third signal; and initializing means having an electrode maintained at a constant potential, said electrode being arranged along said first horizontal CCD for intializing said first horizontal CCD by transferring said charges existing in said first horizontal CCD in response to a first signal directly to said electrode such that each charge is shifted from said first horizontal CCD to an adjacent portion of said electrode at once.

In accordance with the present invention there is provided a first imaging apparatus having the first imaging device further comprising:

a drive circuit for producing said first, second, and third signals in response to a horizontal blanking signal; and means for controlling starting and ending timings of transferring said charges by said third signal in accordance with an external signal.

In accordance with the present invention there is also provided a second imaging apparatus including the first imaging apparatus, further comprising:

a first movement detector for detecting movement amount of picture image projected onto said imaging device relative to said imaging device in the horizontal direction over a scanning cycle of said plural CCD, a detection signal thereof being applied to said drive circuit as said external signal.

In accordance with the present invention there is further provided a second imaging devices comprising:

first and second CCD imagers arranged in main scanning direction, said first and second imagers being responsive to two different driving signals respectively to respectively produce first and second output video signals each indicative of an image made on photoelectric conversion surface thereof, each of said first and second imagers having plural vertical CCDs arranged in said main scanning direction, charges produced by said photoelectric conversion surface being transferred in response to a vertical blanking signal.

In accordance with the present invention there is provided a third imaging apparatus having second imaging device comprising:

a variable delay timer responsive to a horizontal blanking signal, the delay time thereof being determined by an external signal; a timing generator responsive to said output signal of said variable delay timer for producing a first signal for a first predetermined time period and a second signal for a second predetermined time period immediately after said first predetermined time period; a first drive circuit responsive to said first signal for producing a first drive signal applied to a horizontal CCD of said first imager for said first predetermined time period; a second drive circuit responsive to said second signal for producing a second drive signal applied to a horizontal CCD of said second imager for said second predetermined time period; switch means for transferring first and second output video signals for a scanning period between two consecutive horizontal blanking signals, the sum of said first and second predetermined time periods being longer than one horizontal blanking interval of said horizontal blanking signal so that said first and second output video signals are outputted from said first and second imagers over a period of time longer than one horizontal blanking interval; a first vertical drive circuit responsive to said first signal for producing a first vertical drive signal for said plural vertical CCDs of said second imager; and a second vertical drive circuit responsive to said second signal for producing a second vertical drive signal for said plural vertical CCDs of said first imager.

In accordance with the present invention there is also provided a fourth imaging apparatus including third imaging apparatus, further comprising:

a first movement detector for detecting movemet amount of picture image projected onto said imaging device relative to said imaging device in horizontal direction over a scanning cycle of said plural CCD, detection signal thereof being applied to said variable delay timer as said external signal.

In accordance with the present invention there is further provided a fifth imaging apparatus including fourth imaging apparatus, wherein said first and second vertical drive circuits further comprising means for producing first and second high speed transfer signals respectively in response to a vertical blanking signal for a period of time between said vertical blanking signal and a first horizontal blanking signal which follows said vertical blanking signal, said first and second high speed transfer signals being applied to said horizontal CCDs of said first and second imagers respectively, and means for controlling duration of said first and second high speed transfer signals in accordance with a second external signal.

In accordance with the present invention there is further provided a sixth imaging apparatus including fifth imaging apparatus, further comprising:

a first movement detector for detecting the amount of movement of a picture image projected onto said imaging device relative to said imaging device in vertical direction over a scanning cycle of said plural CCD, detection signal thereof being applied to said first and second drive circuits as said second external signal.

BRIEF DESCRIPTION OF THE DRAWINGS

The object and features of the present invention will become more readily apparent from the following detailed description of the preferred embodiments taken in conjunction with the accompanying drawings in which:

FIGS. 13, 18, 19 show waveforms for illustating operation of imaging apparatus as shown in FIG. 11;

The same or corresponding elements and parts are designated at like reference numerals throughout the drawings.

DETAILED DESCRIPTION OF THE INVENTION

Figure 2:
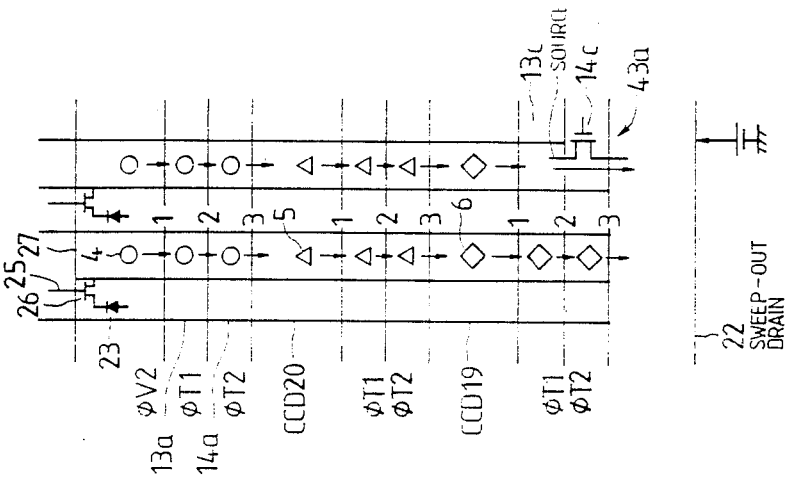
FIG. 2 is a fragmentary enlarged plan view of a CCD imaging device of FIG. 1.
Figure 1:
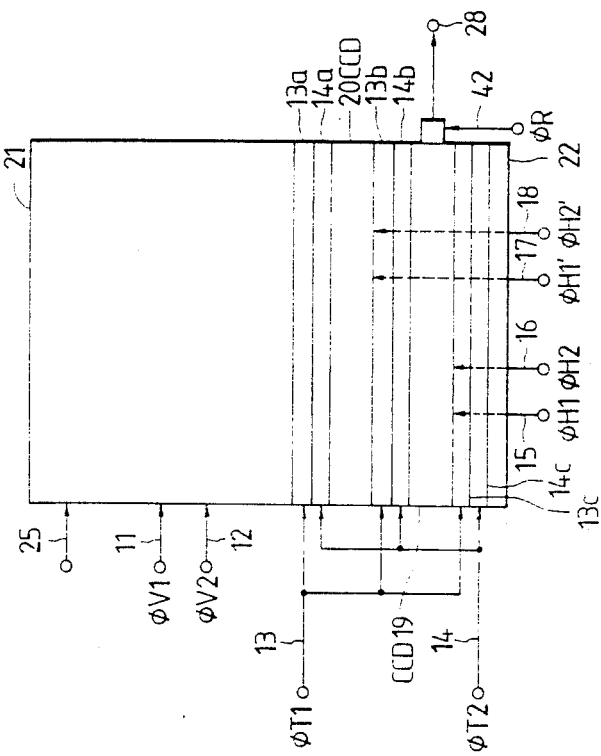
FIG. 1 is a plan view of a CCD imaging device according to first embodiment of the invention.

Referring now to the drawings, FIG. 1 shows an imaging device of a first embodiment according to the invention and FIG. 2 shows a fragmentary enlarged view of FIG. 1.

In FIGS. 1 and 2, an interline type CCD (charge coupled device) imaging device of the first embodiment comprises a photoelectric conversion surface 21 having photoelectric conversion elements 23 arranged in horizontal and vertical directions; vertical CCDs 27 for transferring charges from the photoelectric conversion elements 23; transfer gates 26 which transfer charges produced by the photoelectric conversion elements 23 in response to a transfer pulse 25; at least one of horizontal CCD 20 for transferring charges from the vertical CCDs 27 in horizontal direction which are also capable of transferring charges distributed over the horizontal CCD 20 to another horizontal CCD 19 with each charge distributed over CCD 20 transferred to the corresponding position of the horizontal CCD 19, the horizontal CCD 19 receiving charges from the horizontal CCD 20 as well as transferring the charges in the horizontal direction; and a MOS FET 43a as charge initializing means having potential well array made by a electrode 13c, as a source, arranged adjacent to each potential wells of the horizontal CCD 19; a sweep-out drain 22; and electrode 14c which acts as a gate.

Hereinbelow will be described operation of the interline type CCD 10.

In FIG. 2, plural photodiodes 23 as photoelectric conversion elements generate charges in accordance with the amount of incident light respectively. Charges generated at photodiodes 23 are respectively transferred to the vertical CCDs 27 by transfer gates 26 respectively. This is done during a vertical blanking period in response to a vertical blanking signal. Then, photodiodes 23 start to convert light energy of incident light to electric charges again.

Figure 3:
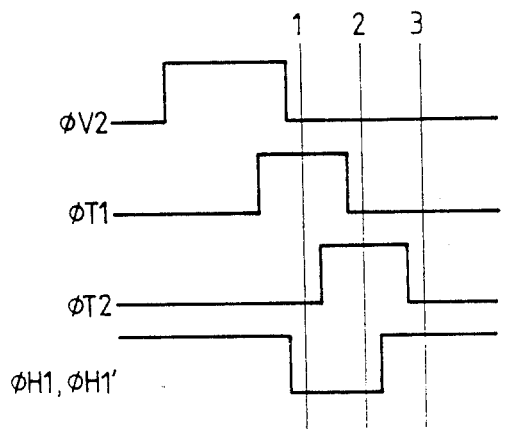
FIG. 3 shows waveforms for illustrating FIG. 2

A charge 4 transferred to the vertical transfer CCD 27 is transferred to a position corresponding to an electrode 13a when a signal $\Phi T1$ is applied to the electrode 13 (terminal) is at high level and signal $\Phi V2$ turns to low state, i.e., a timing 1, as shown in FIG. 3. When a signal $\Phi H1'$ applied to the terminal (electrode) 17 goes to a high level as well as a signal $\Phi T2$ goes to low level, i.e., at timing 3, the charge 4 transfers to a horizontal transfer CCD 20. At the same instant, the signal $\Phi H1'$ applied to the terminal (electrode) 17 causes the horizontal CCD 20 to hold the charge 4 in horizontal direction at the timing that the signal $\Phi H1'$ rises between timings 2 and 3.

Similarly, a charge 5 at the horizontal transfer CCD 20 is transferred to the horizontal transfer CCD 19 at this timing, i.e., timing 3. Charge 6 at the horizontal transfer CCD 19 is transferred to position corresponding to an electrode 13c, i.e., a potential well array thereof at timing 1 by falling level of the signal $\Phi H1$ as well as rising level of the signal $\Phi T1$. The charge 6 is transferred to a sweep-out drain 22 at timing 2 by making transition of signal $\Phi 2$ from L to H and making transition of the signal $\Phi T1$ from H to L, at timing 2. Therefore, all charges existing in the horizontal CCD 19 are reset at once. In other words, the horizontal transfer CCD 19 is initialized.

The charge 4 transferred to the horizontal transfer CCD 20 are transferred in the horizontal direction by signals $\Phi H1'$ applied to the terminal 17 and $\Phi H2'$ applied to the terminal 18 during the horizontal scanning period. The signal $\Phi H2'$ is made for a horizontal scanning period by inverting the signal $\Phi H1'$. The charge 5 is transferred serially in the the horizontal direction by the signal $\Phi H1$ applied to a terminal (electrode) 15 and $\Phi H2$ applied to a terminal (electrode) 16, outputted at a terminal 28. The signal $\Phi H2$ is made by inverting the signal $\Phi H1$ for horizontal scanning period. A charge is released by a signal $\Phi R$ inputted at an electrode 42. Therefore, a charge existing in the output portion of the horizontal transfer CCD 19 is reset. Another reset electrode 42 may be provided to the horizontal transfer CCD 20, if necessary. An unshown amplifier is provided between the output of horizontal transfer CCD 19 and the output terminal 28. In this embodiment, a pair of transfer electrodes are provided to the horizontal transfer CCDs 19, 20 and the vertical transfer CCD 27 respectively. However, one- or four- electrode type charge-transfer systems can be applied to these CCDs, as generally known.

Figure 8:
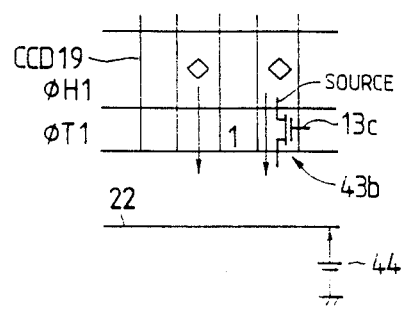
FIGS. 8 and 9 are illustrations of operation of the first embodiment.

Further, in the above-mentioned charge initializing means of this embodiment, charges are transferred to the sweep-out drain 22 after the potential well array once holds the charges. However, initializing can be made without once holding because as shown in FIG. 8, a MOS FET 43b can be formed with each potential well of the horizontal CCD 19 acting as a source; the electrode 13c, as a gate; and the sweep-out drain 22, as a drain. The MOS FET 43b can operate as a charge initializing means also. The MOS FET 43b turns on, transferring the charge 6 to the sweep-out drain 22 maintained at a constant potential by a voltage source 44.

Figure 9:
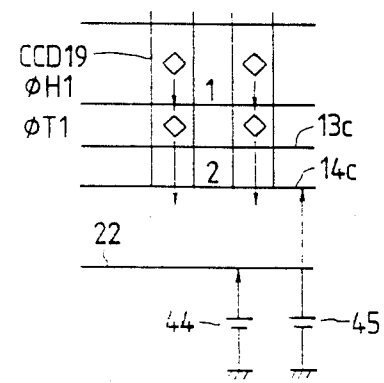
Figure 10A:
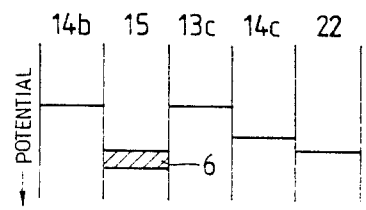
FIG. 10A, 10B, 10C are illustration of operation of FIG. 9.
Figure 10B:
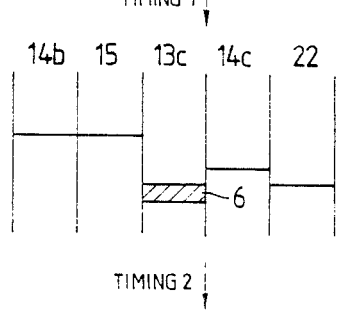
Figure 10C:
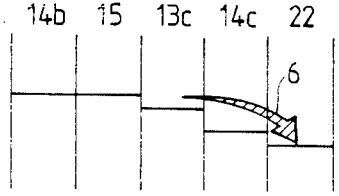

Moreover, the charge initializing means can be formed, as shown in FIG. 9. A constant potential is applied to the electrode 14c by the voltage source 45. The constant potential is lower than potential of the sweep-out drain 22 but higher than that at a low level, which is applied to the terminals 13, 14. As shown in FIGS. 10A, 10B, a charge 6 indicated by hatched lines transfers to a position corresponding to that of the electrode 13c, i.e., a potential well array at timing 1. At timing 2, the charge 6a climbs over a potential barrier by electrode 14c, as shown in FIGS. 10B, 10C. Accordingly, the horizontal transfer CCD 19 is reset. This construction is different in technique for using MOS FET from the above-mentioned two initializing means. However, the electrode 14c and the sweep-out drain 22 which act as a source and gate-and-drain respectively, constitute a MOS FET as a charge intializing means similarly.

As mentioned above, the interline type CCD 10 according to the invention enables transferring charges of the horizontal transfer CCDs 19,20 in the horizontal direction at the same instance by different driving pulses as well as enables initializing the horizontal transfer CCD 19 in response to an external singnal.

Hereinbelow will be described a CCD imaging apparatus of the second embodiment according to the invention, which uses the above-mentioned interline type CCD 10.

The interline type CCD 10 of this embodiment has more pixels in the horizontal direction than a display such as a standard type television, thereby enabling extracting an image from the whole area of the interline type CCD 10. Therefore, a CCD imaging apparatus using the interline type CCD 10 suited for extracting an image is provided by controlling the times of transferring charges in the horizontal direction of horizontal transfer CCD 20 by the driving circuit 32 shown in FIG. 4.

Figure 4:
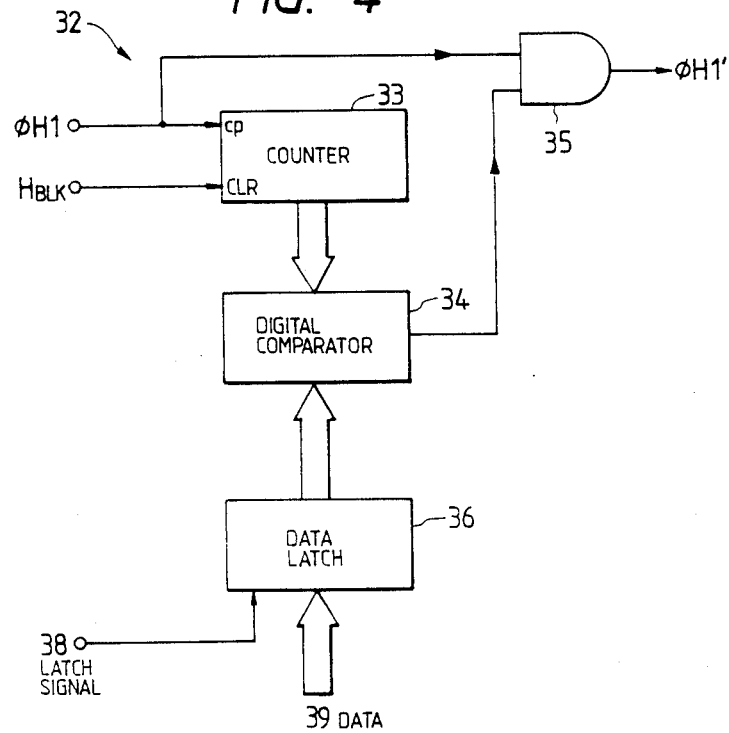
FIG. 4 is a block diagram of driving pulse generator of an imaging apparatus of the second embodiment.

In FIG. 4, a counter 33 counts a pulse signal $\Phi H1$ income to an input CP. A horizontal blanking signal $H_{BLK}$ is applied to an input CLR of the counter 33, thereby the counter 33 being initialized. An output of the counter 33 is sent to a digital comparator 34. A data indicative of the times of transferring charge for the horizontal transfer CCD 20 is applied to an input of a data latch 36 which holds the data at the output thereof in response to a latch signal 38.

An output of the data latch 36 is applied to the input of the digital comparator 34. The digital comparator 34 sends an output thereof to an input of a two-input AND gate 35 when the counting output is larger than data from the data latch 36. Another input of AND gate 35 is responsive to the signal $\Phi H1$. Accordingly, in the signal $\Phi H1$ for transferring drive pulse of the horizontal transfer CCD 19 are generated continuously for horizontal scanning period. On the other hand, the signal $\Phi H1'$ for the horizontal transfer CCD 20 includes pulses of the number according to the transferring times data 39. In this way, the charges of the extracted image in the horizontal transfer CCD 20 are shifted to an end thereof which exists on the same side of the output 28, and are then being transferred in vertical direction to the horizontal transfer CCD 19. This means extraction of image because the horizontal transfer CCD 19 immediately outputs the beginning of extracted image just after the end of a blanking period.

Hereinbelow will be the described operation of the image extraction more specifically.

Figure 5:
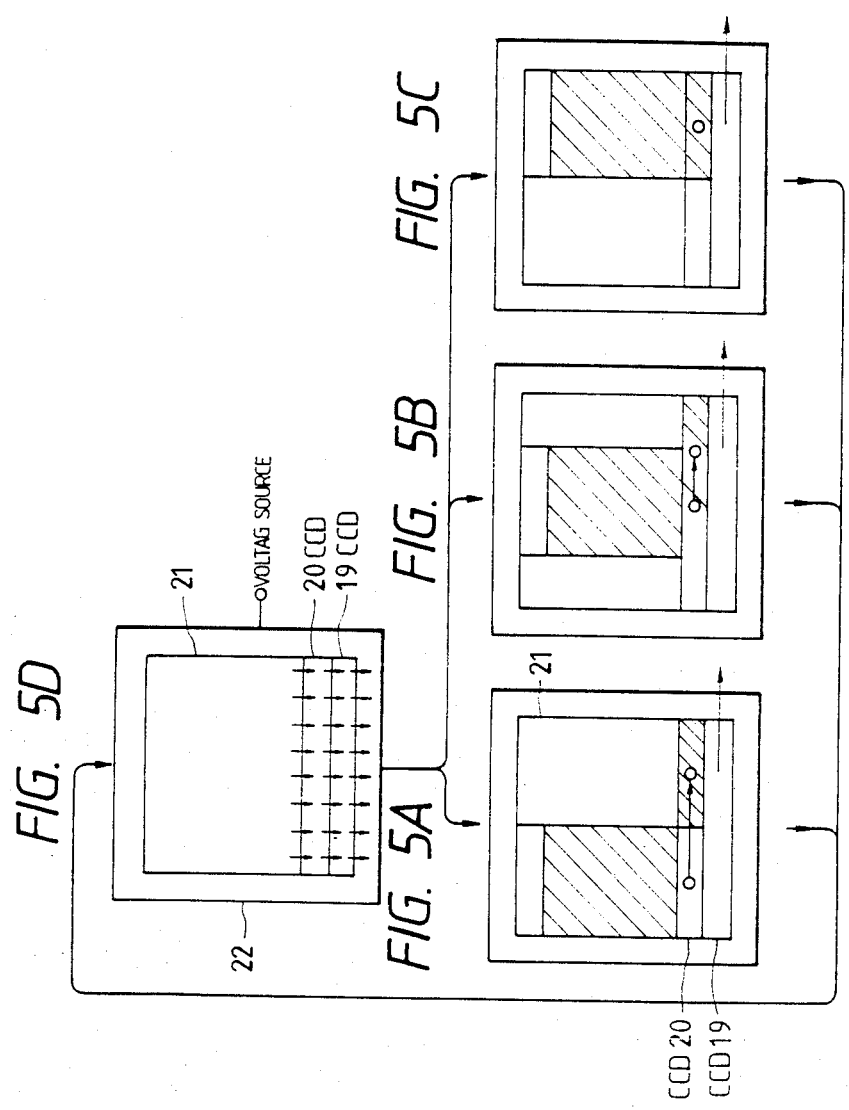
FIGS. 5A, 5B, 5C, 5D are illustrations of operation of the imaging apparatus according to the second embodiment of the invention.
Figure 6:
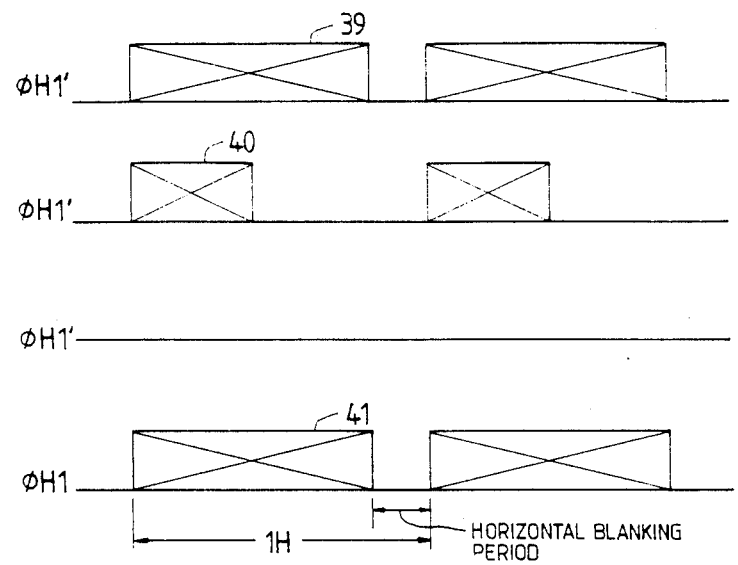
FIG. 6 shows waveforms for illustrating the operation of the imaging apparatus of the second embodiment.
Figure 7:
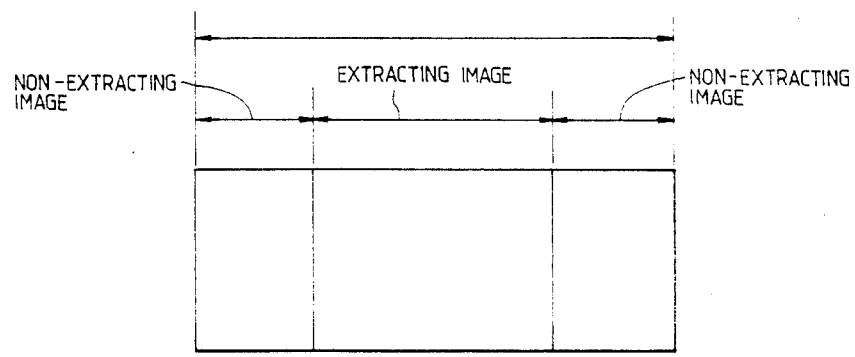
FIG. 7 is an illustration of operation for the second embodiment which is common to prior art.

In FIGS. 5A to 5D, which are schematic illustrations of the interline type CCD 10, when an image of a hatched portion is extracted, as shown in FIG. 5A, the charges detected at FIG. 5D by photodiodes 23 are transferred to the vertical transfer CCDs 27 in response to a vertical blanking signal, further being transferred in the vertical direction by one pixel in response to a horizontal blanking signal, as shown in FIG. 5A. This means charges located in the lowest row of the potential wells of the vertical transfer CCDs 27 are transferred to the horizontal transfer CCD 20. If there exist charges in the horizontal transfer CCD 20, the charges are transferred to the horizontal transfer CCD 19. If there exist charges in the horizontal transfer CCD 19, the charges are transferred to the sweep-out drain 22 before charges locating the lowest row of the vertical transfer CCDs 27 are transferred to the horizontal transfer CCD 19. A pulse train 41 whose number of the pulses corresponds to that of pixels necessary for displaying is applied to the horizontal transfer CCD 19 at every one horizontal scanning cycle (1H), as shown in FIG. 6, wherein the extracted image has the same horizontal pixels as that of a standard type of display. At the same instance, a pulse train 39 is applied to the horizontal transfer CCD 20 which causes the charge at the left half of the horizontal transfer CCD 20 to be shifted to the right half thereof. The pulse train 39 has pulses whose cycle period is the same as that of the pulse train 41. The operation of transferring charges returns FIG. 5D. Charges of the horizontal transfer CCDs 19, 20 are transferred downward by one step. Accordingly, the charges indicative of the extracted image located in the right half of the horizontal transfer CCD 20 are transferred to the right half of the horizontal transfer CCD 19. Therefore, the image signal of the extracted image is outputted from the horizontal transfer CCD 19 no sooner than the pulse train 41 is applied to the horizontal transfer CCD 19. This means read out speed of the horizontal transfer CCDs 19, 20 is the same as that of the conventional, type CCD imager. Therefore, the picture quality displayed is maintained when extraction of image is done. Repeating the operations of FIGS. 5D, 5A provides the image signal of the extracting image just after a horizontal blanking period.

If a middle part is extracted from the whole detected image, similarly, the operations of FIGS. 5D, 5B are repeated. In FIG. 5A, the pulse train 41 is applied to the horizontal transfer CCD 19, while a pulse train 40, whose number of pulses is half of that of the pulse train 41 is applied to the horizontal transfer CCD 20. Accordingly, as shown in FIG. 5B, charges of the extracted image located in the middle of the horizontal transfer CCD 20 are transferred to the right half of the horizontal transfer CCD 20. Therefore, the image signal of the extracted image is outputted from the horizontal transfer CCD 19 just after a horizontal blanking period. Changes remaining in the horizontal transfer CCD 19 at operation of FIG. 5D are not mixed with transferred charges from the horizontal transfer CCD 20 because they are transferred to sweep-out drain 22.

If an image of a right part of the image plane is extracted from the whole detected image, similarly, the operations of FIGS. 5D, 5C are repeated. In FIG. 5C, the pulse train 41 is applied to the horizontal transfer CCD 19, while no pulse is applied to the horizontal transfer CCD 20 because the extracted image signal is obtained just after a horizontal blanking period without horizontal transfer by the horizontal transfer CCD 20.

As mentioned above, location of an extracted image can be controlled by the number of pulses of signal $\Phi H1$ applied to the horizontal transfer CCD 20. This means that location of an extracting image is determined by the data of the number of transfer pluses 39.

In the above-mentioned embodiment, the image plane has a width twice that of the maximum extracting image size, i.e., pixels twice that of the maximum extracting image size. It is possible that the image plane has width three times that of the maximum extracting image size. In this case, an additional horizontal transfer CCD 20 is provided. the number of a horizontal transfer pulses for the added horizontal transfer CCD 20 is also controlled. Therefore, the number of horizontal transfer CCD 20 is determined in accordance with the ratio of the number of pixels of the extracting image to that of whole image plane.

In FIG. 1, signal $\Phi H2$, $\Phi H2'$ are applied to the horizontal transfer CCDs 19, 20. These signal are obtained by inverting signal $\Phi H1$, $\Phi H1'$ respectively.

Hereinbelow will be described a third embodiment of interline CCD according to the invention.

Figure 11:
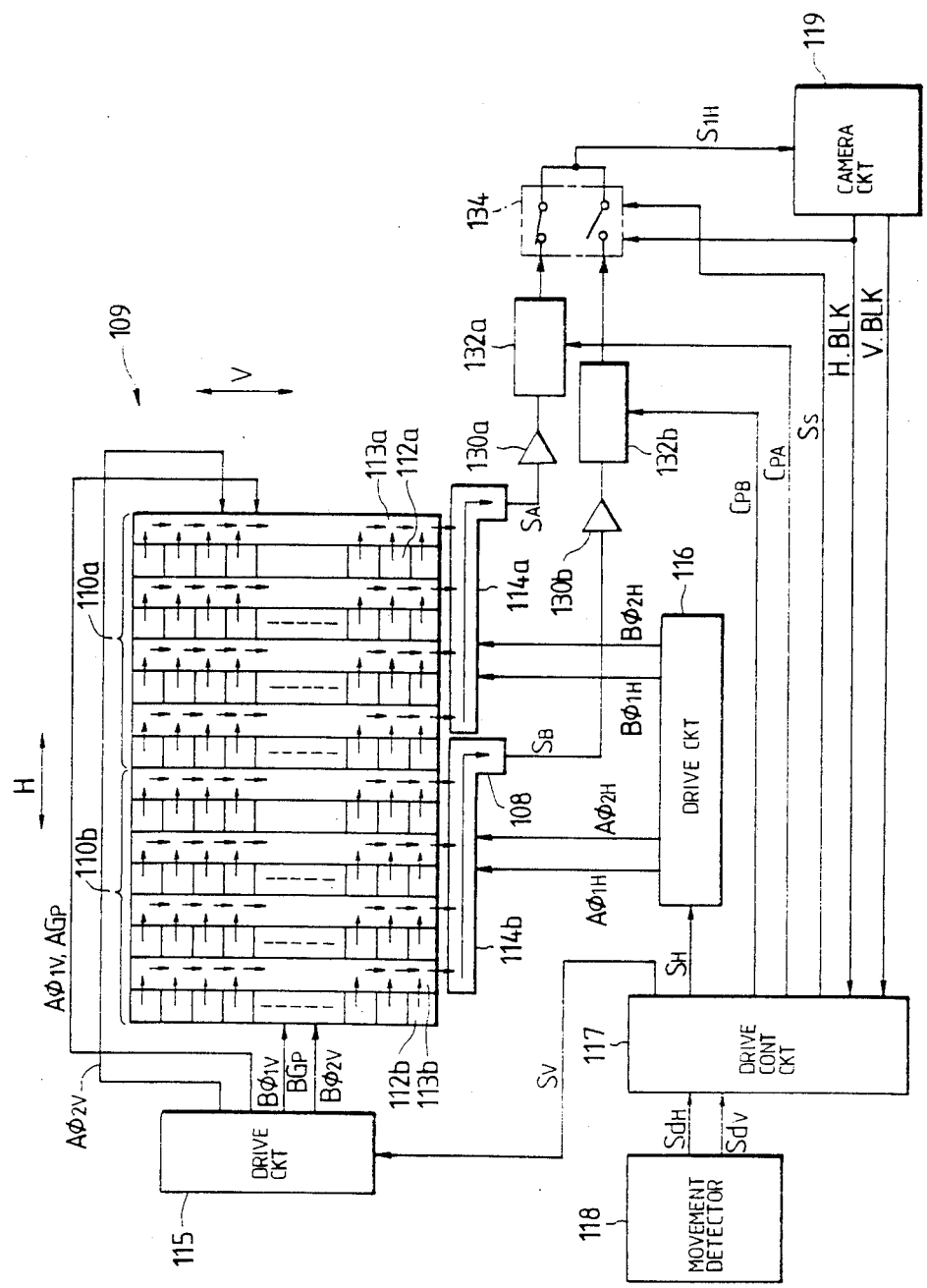
FIG. 11 is a block diagram of an imaging apparatus of and fifth embodiment including an imaging device of fourth embodiment.
Figure 12A:
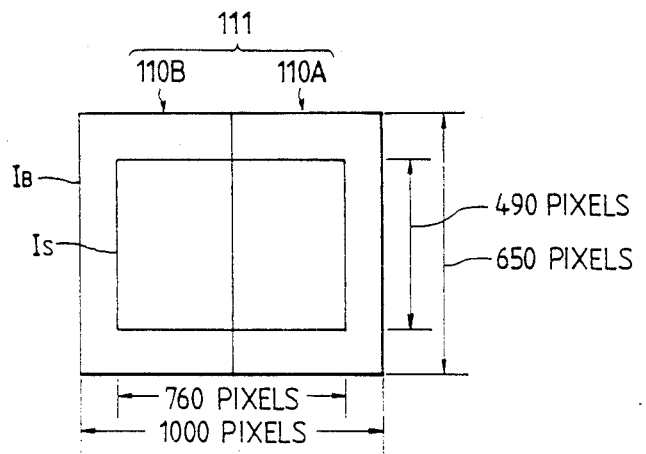
FIG. 12 A is an illustration of an imaging device of FIG. 11.
FIG. 12B is a block diagram of a drive control circuit and drive circuit of FIG. 11.
FIG. 12C is a block diagram of a timer circuit of FIG. 12B.

FIG. 11 shows an imaging device suited for extracting partial image and a peripheral circuits for driving or controlling the same. In FIG. 11, the imaging device 109 has two interline CCDs (charge coupled device) 110a, 110b which are driven separately from each other. These interline CCDs 110a, 110b are arranged in the horizontal direction (main scanning direction which is shown by an arrow marked "H" in FIG. 11). The image device 109 has an photoelectric conversion surface 111 of a size (1000×650 pixels) larger than that of an imaging device (760×490 pixels) used for the standard broadcasting system, for example, NTSC system, as shown in FIG. 12A.

The interline CCDs 110a, 110b have photoelectric conversion portions 112a, 112b having unshown photoelectric conversion elements arranged in the vertical direction (sub-scanning direction which is denoted with arrow "V" ) respectively and vertical transfer CCD arrays 113a, 113b interposed between the photoelectric conversion portions 112a, 112b respectively, the vertical transfer CCD arrays 113a, 113b and the photoelectric conversion portions 112a, 112b being arranged in the horizontal direction, and horizontal transfer CCD arrays 114a, 114b arranged on and along the end portion of the vertical transfer CCD arrays 113a, 113b respectively.

At least one unshown photoelectric conversion element of each of interline CCDs 110a, 110b is masked for obtaining dark current for compensation of dark level of image signal. These photoelectric conversion elements are arranged outside of area required for displaying.

The vertical transfer CCD arrays 113a,113b are driven by two-phase signal of vertical transfer signals $A\Phi_{1V}$, $A\Phi_{2V}$ and by two-phase signal of vertical transfer signals $B\Phi_{1V}$, $B\Phi_{2V}$ respectively. These signals are produced by a drive circuit 115. The vertical transfer CCD arrays 113a, 113b are driven seperately. The horizontal transfer CCD arrays 114a, 114b are driven by two-phase signal of vertical transfer signals $A\Phi_{1V}$, $A\Phi_{2V}$ and by two-phase signal of vertical transfer signals $B\Phi_{1V}$, $B\Phi_{2V}$ respectively. These signals are produced by a drive circuit 116. The horizontal transfer CCD arrays 114a, 114b are separated by an unshown channel stop layer. The end 108 of the horizontal transfer CCD array 114b is so formed as to bend at a right angle, as shown in FIG. 11. Unshown electrodes are also so arranged that the horizontal transfer CCD array 114b is bent at the end 108.

The vertical transfer CCD arrays 113a, 113b are driven separately. The drive circuit 115 also produces gate pulses $AG_P$, $BG_P$ for transferring charge accumulated in the photoelectric conversion portions 112a, 112b and sends to vertical transfer CCD arrays 113a, 113b respectively. Each of gate pulses $AG_P$, $BG_P$ is produced separately and added to the vertical transfer signals $A\Phi_{1V}$ and $A\Phi_{1V}$ respectively.

Operation and timing of the drive circuits 115, 116 are respectively controlled by vertical and horizontal control signals $S_V$, $S_H$ which are produced by a drive control circuit 117.

Hereinbelow will be described an imaging apparatus using the CCD imaging devices 109 of the fourth embodiment of the invention, which is capable of extracting image of a desired area.

The imaging apparatus of this embodiment has a drive control circuit 117, camera circuit 119, and switch circuit 134 in addition to the third embodiment structure. Horizontal and vertical detected signals $S_{dH}$, $S_{dV}$ and horizontal and vertical blanking signals $H_{BLK}$, $V_{BLK}$ are applied to the drive control circuit 117. The drive control circuit 117 produces the horizontal and vertical control signals $S_H$, $S_V$ based on these signals.

Figure 12B:
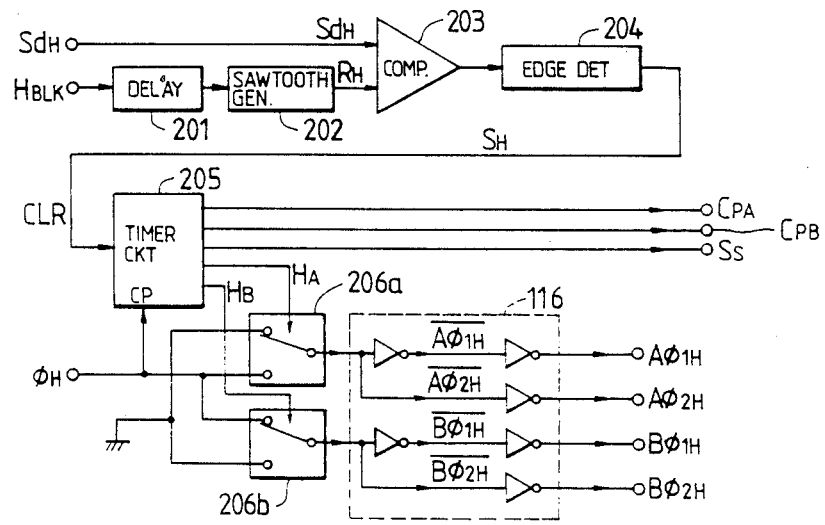
Figure 12C:
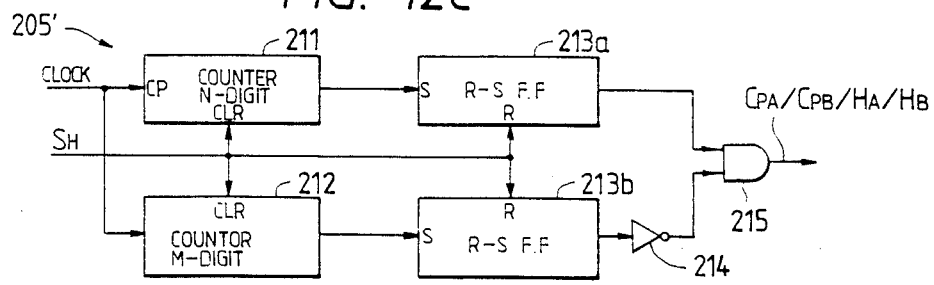

As shown in FIG. 12B, the drive control circuit 117 has a delay circuit 201 responsive to the horizontal blanking signal $H_{BLK}$ from the camera circuit 119, a sawtooth generator 202 responsive to output of the delay circuit 201 for producing the reference signal RH (shown by waveform 302 in FIG. 13) which is sent to an input of a level comparator 203, the level comparator 203 for comparing the reference signal RH with the horizontal detection signal $S_{dH}$ which is applied to another input thereof, edge detector 204 responsive to the level comparator 203, a timer circuit 205, i.e., a counter circuit whose reset input is responsive to output of the edge detector 204 and whose clock input is supplied with a clock signal $\Phi H$, a switch circuit 206a which transfers the clock signal in response to an output signal $H_A$ from the timer circuit 205 to drive circuit 116 in order to produce drive signals $A\Phi 1$, $A\Phi 2$, and a switch circuit 206b which transfers the clock signal in response to an output signal $H_B$ from the timer circuit 205 to drive circuit 116 in order to produce drive signals $B\Phi 1H$, $B\Phi 2H$ The timer circuit 205 also produces signals $C_{PA}$, $C_{PB}$, and $S_S$. These signal are shown in FIG. 13 by waveforms 301 to 317. The timer circuit 205 has five counter circuits 205' shown in FIG. 12C which comprises N-digit counter 11 and M-digit counter 212 counting a clock signal, cleared by the signal $S_H$. Outputs of the counters 211, 212 are sent to a R-S F.F. 213a, 213b reset by the signal $S_H$ respectively. An output signal of the R-S F.F. 213a is applied to a AND gate 215. An output of R-S F.F. 213b is sent to the AND gate 215 through an inverter 214. In an output of the AND gate 215, timing and pulse width of $C_{PA}$, $C_{PB}$, $H_A$, or $H_B$ are determined by the digits M, N of these counter 211, 212, as shown by waveforms 303, 304, 307, 308, 309.

The drive control circuit 117 produces horizontal and vertical control signals $S_H$, $S_V$ as follows:

The drive control circuit 117 generates a reference signal $R_H$ of sawtooth waveform 302 shown in FIG. 13 in response to the horizontal blanking signal $H_{BLK}$ of waveform 301. The drive control circuit 117 produces the horizontal control signal $S_H$ of waveforms 310 and 317 by comparing the reference signal RH with the horizontal detection signal $S_{dH}$, as shown in waveform 302.

Phase relation between the horizontal control signal $S_H$ and the horizontal blanking signal $H_{BLK}$ changes in accordance with a level of the horizontal detection signal $S_{dH}$. Waveforms 303 to 310 shows timings of these signals in the case that the comparator 203 detects coincidence of the reference signal RH with the signal $S_{dH}$ at t1; waveforms 311 to 317, at t2. Therefore, the delay circuit 201, sawtooth generator 202, level comparator 203, and edge detector 204 constitute a variable timer. The timer circuit 205 produces signals $H_A$, $H_B$ as shown in waveforms 303, 304. The switch circuits 206a, 206b produce horizontal transfer signals $A\Phi_{H1}$, $B\Phi_{H1}$ in response to signals $H_A$, $H_B$, as shown in waveforms 305, 306. The timer circuit 205 produces switching signal $S_S$, as shown in waveforms 309, 316. A high level of the switching signal $S_S$ indicates that an image signal $S_A$ from the horizontal transfer CCD array 114a is selected by the switch circuit 134; a low level, an image signal $S_B$ from the horizontal transfer CCD array 114b is selected. The timer circuit 205 produces clamp signals $C_{PA}$, $C_{PB}$ which are sent to clamp circuits 132a, 132b. The clamp circuits 132a, 132b clamp the image signals $S_A$, $S_B$ from horizontal transfer CCD arrays 114a, 114b respectively in response to the clamp signals $C_{PA}$, $C_{PB}$ which indicate output timing of the image output signal of unshown masked photoelectric conversion element. This is provided for compensation of dark current (charge) which are different between the horizontal transfer CCD array 114a and horizontal transfer CCD array 114b.

The drive control circuit 117 is so designed that the reference signal RH and the horizontal detection signal $S_{dH}$ produce the control signal $S_H$ at t3 when the detection signals $S_{dH}$ and $S_{dV}$ are at zero level.

Figure 20:
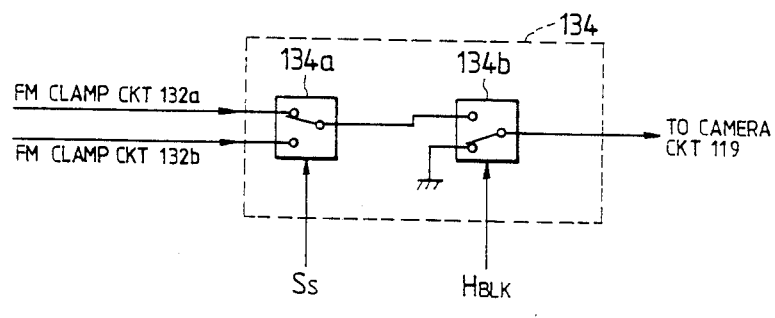
FIG. 20 is a block diagram of switch circuit shown in FIG. 11.

Output signals $S_A$, $S_B$ from the horizontal transfer CCD arrays 114a, 114b are applied to amplifiers 130a, 130b respectively which amplify these signals with their gains adjusted to compensated the level difference between the two signals outputted from the two CCDs which are often different each other. Amplified signals are sent to clamp circuits 132a, 132b respectively which clamp these amplified signals in response to clamp signals $C_{PA}$, $C_{PB}$ for obtaining dark current level and remove dark current component from the amplified signals respectively. Output signals from the clamp circuits 132a, 132b are applied to the switch circuit 134. The switch circuit 134 transfers the signal from the clamp circuit 132a when the switching signal $S_S$ is high and transfers the signal from the clamp circuit 132b when the switching signal $S_S$ is low. Another control signal is applied to the switch circuit 134, which is the horizontal blanking signal $H_{BLK}$. Actually, the switch circuit 134 has two switchs 134a, 134b. These switches are connected in series, as shown FIG. 20. The switch circuit 134b does not transfer the output signals from the switch circuits 134a during a horizontal blanking period. The switch circuit 134a transfers either signal from the clamp circuit 132a of clamp circuit 132b in response to the switching signal $S_S$. Output signal of the switch circuit 134 is sent to the camera circuit 119 which generates an NTSC video signal and horizontal and vertical blanking signals applied to the driving control circuit 117.

Hereinbelow will be described the operation of the imaging apparatus of this embodiment for extracting image in the horizontal direction.

Figure 18:
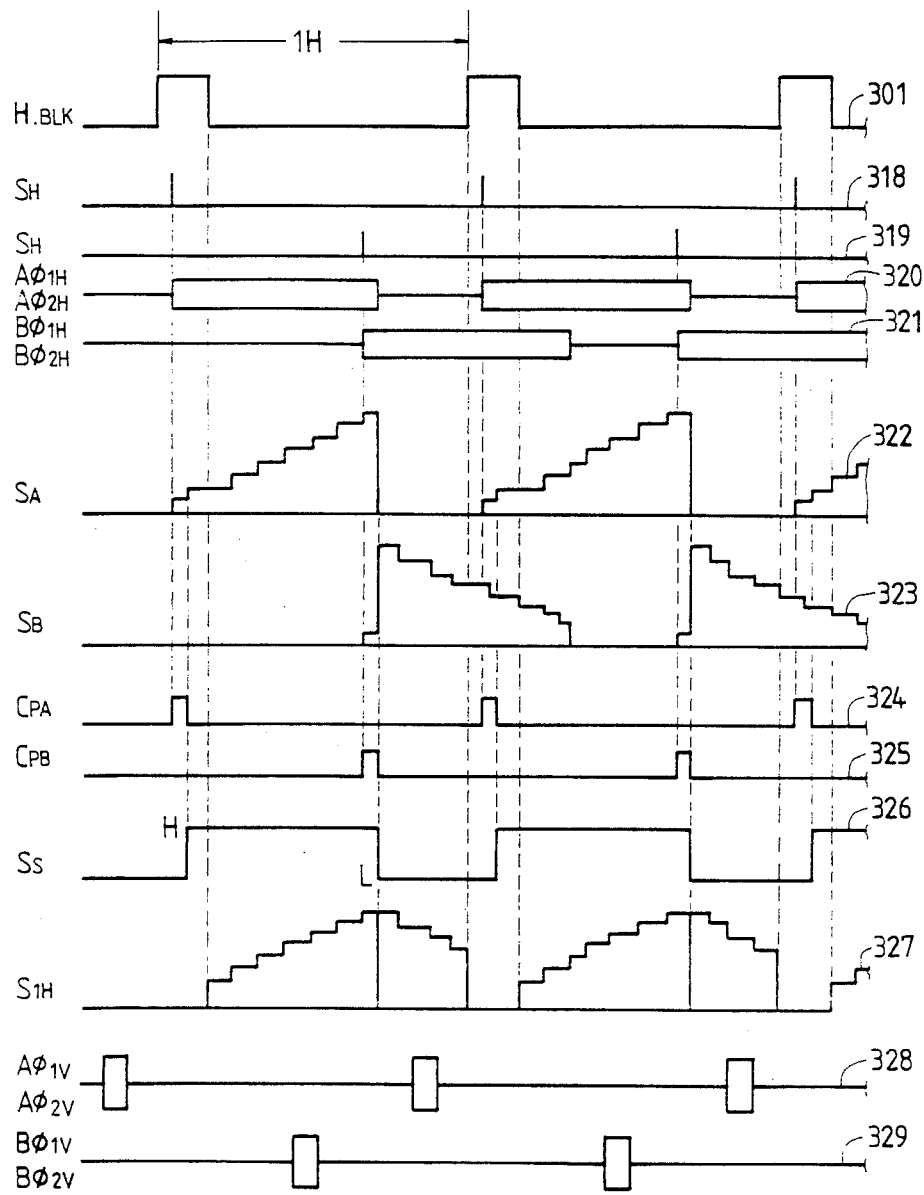

In FIG. 18, signals shown by the waveforms 301, 318, to 321, 324 to 326 are the same signals, as shown in FIG. 13. Accordingly, the detailed description of these signals is omitted. The image signal $S_A$ shown by the waveform 322 is outputted from horizontal transfer CCD array 114a in response to the signal $A\Phi_{1H}$. The image signal $S_B$ shown by the waveform 323 is outputted from horizontal transfer CCD array 114b in response to the signal $B\Phi_{1H}$. The image signal $S_B$ follows the image signal $S_A$ continuously. The switch circuit 134 transfers the image signal when switching signal $S_S$ is high and for the following period that the swiching signal $S_S$ is at a low level, it transfers the image signal $S_B$. However, these image signals $S_A$, $S_B$ are not transferred for horizontal blanking period. The transferred image signal $S_{1H}$ is sent to the camera circuit 19. The vertical transfer signal $A\Phi_{1V}$ is produced when the horizontal transfer signal $B\Phi_{H1}$ is generated. Therefore, the vertical transfer signal $A\Phi 1V$ is produced in correspondence to the signal $H_B$. Similarly, the vertical transfer signal $B\Phi_{1V}$ is produced in respose to the signal $H_A$.

As mentioned above, the image signal $S_A$ is so connected to the image signal $S_B$ in series that these signals form a continuous signal of one scan line. These image signals $S_A$, $S_B$ are obtained by the imaging device 109 having a wider size than the standard type of imaging devices. The horizontal transfer signals are generated at the same cycle as the standard type of imaging devices. Therefore, the total time period for outputting the image signals $S_A$, $S_B$ is longer than the standard scanning period.

The switch circuit 134 transfers the image signals $S_A$, $S_B$ for the horizontal scanning period. Accordingly, if the horizontal detection signal $Sd_H$ changes in level, as shown in FIG. 13, signals of waveform 320 to 329 shown in FIG. 18 are shifted in response to the signal $S_H$ in comparison with the horizontal blanking signal $H_{BLK}$ of waveform 301 which is generated in a fixed cycle. Consequently, image signals $S_A$, $S_B$ are shifted with respect to the horizontal blanking signal $H_{BLK}$, so that a position of the extracted image varies in accordace with the horizontal detection signal $S_{dH}$.

Hereinbelow will be described an imaging apparatus of the fifth embodiment according to the invention, using the CCD imaging device 109, which is capable of compensating image position in accordance with relative movement of projected image thereon to the same.

Figure 16:
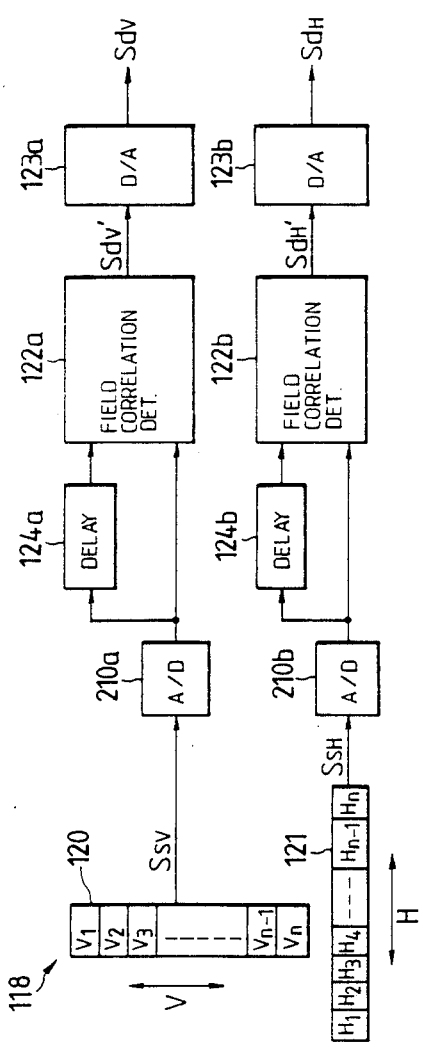
FIG. 16 is a block diagram of a movement detector of FIG. 11.

FIG. 16 is a block diagram of the movement detector 118 which detects movement of and image projected onto the imaging device 109 between the two succesive frames. In FIG. 16, the movement detector 118 comprises a vertical line sensor 120 having photodiodes V1, V2 ... Vn arranged in the vertical direction and a horizontal line sensor 121 having photodiodes H1, H2 ... Hn arranged in the horizontal direction. The image projected onto the imaging device 109 is also projected onto these line sensors 120, 121 by an unshown optical system.

Figure 24:
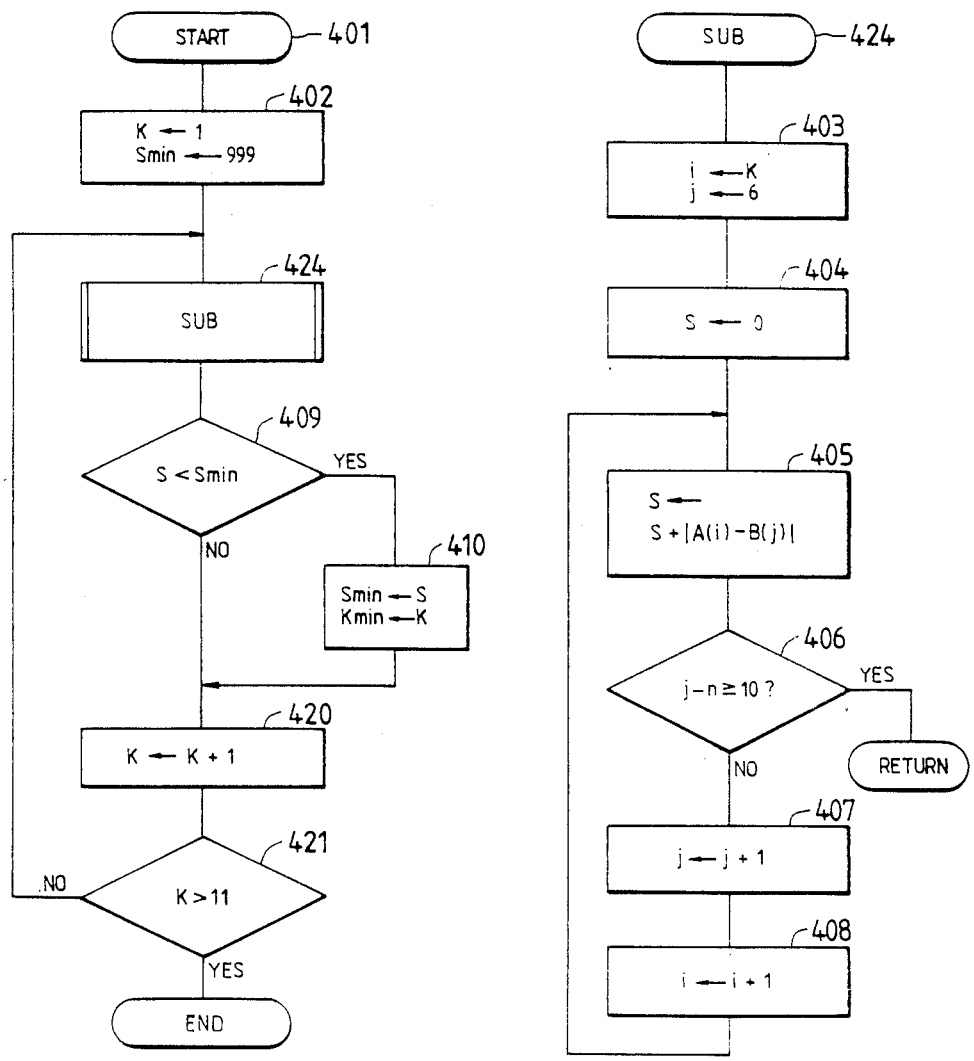
FIG. 24 is a flow chart for movement detector.

The output signals $S_{SV}$, $S_{SH}$ from the vertical and horizontal line sensors 120, 121 are applied to A/D converters 210a, 210b. Output signals of the A/D converters 210a, 210b are sent to a delay circuits 124a, 124b respectively as well as to line correlation detectors 122a, 122b respectively. The delay circuit 124a, 124b delay the signal from the A/D converters 210a, 210b by one field and send their outputs to the correlation detectors 122a, 122b respectively. The correlation detectors 122a, 122b determine the amount of movement of picture image between the present field and the preceding field by detecting correlation (field correlation). The operation of correlation detectors 122a, 122b can be done by a microprocessor system (cpu). The processing for the microcomputer system is shown in FIG. 24 of a flow chart. The data to be used in the program is shown in FIG. 23 which are obtained from the line sensors 120, 121.

Figures 22, 23:
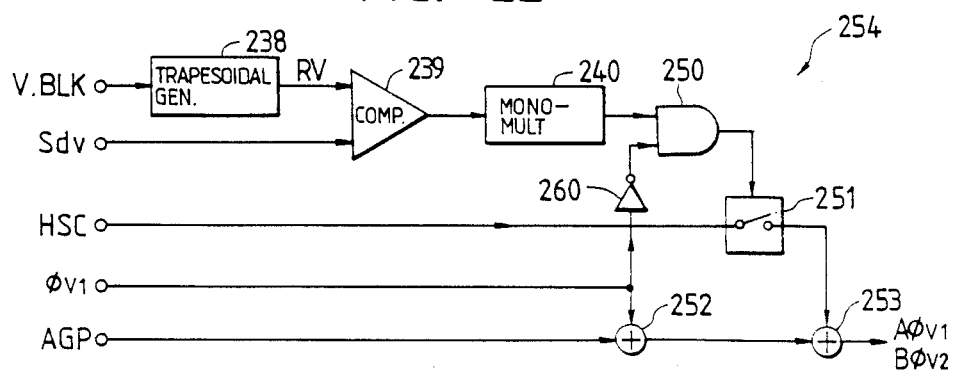
FIG. 22 is a block diagram of drive control circuit shown in FIG. 17.
FIG. 23 shows a structure of data used in the movement detector of FIG. 11.

In FIG. 23, data a(1) to a(20) represent the present field image data; data b(1) to b(20), the preceding field image data. Each group of data corresponds to the photodiode V1 to V20 or H1 to H20.

The cpu performs the process according to the flow chart shown in FIG. 24 as follows:

The process is made for detecting movement of image between successive two fields as to direction and amount. Here, it is assumed that the output data from the A/D converter 210a (present field) are data A: a(1) to a(20) and that output data from the delay circuit (preceding field) are B: b(1) to b(20). The cpu determines which combination of ten data of data B corresponds to ten data of data A, i.e., a(6) to a(15).

The process starts at every field. At first, the cpu determines differences between data a(6) to a(15) and data b(1) to b(10) respectively. The cpu sums up the differences. The cpu repeats this process after only data combination of data B is changed as follows:

b(2) to b(11)
b(3 to b(12)
b(11) to b(20)

The cpu counts up the number of repeated processings. The cpu determines movement amount by the count value Kmin wherein the sum value of differences is minimum.

The result are divided as follows:

If the value (Kmin−6) is smaller than zero, this means the image moved to the right.

If the value (Kmin−6) is equal to zero, this means the image did not move.

If the value (Kmin−6) is larger than zero, this means the image moved to the left.

In FIG. 24, the proccessing start at step 401 at every field. In the following step 402, the cpu sets a variable number of "k" to be "1" and a variable number of "Smin" to be the number "999". Process proceeds to a subroutine 424. In the following step 403 of the subroutine 424, the cpu sets a variable number of "i" to be a variable number of "k" and a variable number "j" to be a number of "6". In the following step 404, the cpu sets a variable number of "S" to be the number "0". In the following step 405, the cpu sets "S" to be a sum of S+an absolute value of A(i) minus B(j). In the following step 406, a determination is made as to whether the value (j−n) is larger than or equal to the value "10". If the value (j−n) is larger than or equal to the value "10" then processing proceeds to step 409. If not, processing proceeds to step 407. In the following steps 407, 408, the cpu counts up "j" and "i". Then processing returns to step 405 until the value (j−n) is larger than or equal to the value "10". The cpu determines the sum value of differences mentioned above in the loop of steps 405, 406, and 405.

When processing branches off at step 406, processing proceeds to step 409. In step 409, a determination is made as to whether "S" is smaller than "Smin". If "S" is smaller than "Smin", the cpu sets "Smin" to be "S" and "Kmin" to be "K" in step 410, proceeding step 420. If not, processing proceeds to step 420 directly. In step 420, the cpu counts up "K". In the following step 421, a determination is made as to whether "K" is larger than "11". If so, the process finishes. If not, the process returns to step 424. The processing repeats until the value "K" is larger than "11". When the value "K" is larger than "11" the value of "Kmin" means movement amount.

The above-mentioned processing is common to detection of movement in the horizontal and vertical directions. In FIG. 16, the field correlation detectors 122a, 122b send signals $S_{dV}'$, $S_{dH}'$ which are based on "Kmins" of vertical and horizontal directions respectively, to D/A converters 123a, 123b respectively. Signals $S_{dV}$, $S_{dH}$ from D/A converters 123a, 123b are applied to the drive control circuit 117. The drive circuit 115 produces gate pulses AGP, BGP, and vertical transfer signals $A\Phi_{1V}$, $A\Phi_{2V}$ as well as the drive circuit 116 produces horizontal transfer signals $A\Phi_{1H}$, $A\Phi_{2H}$, switching signal $S_S$ at respective timings in accordance with signals from the movement detector 118 so that movement of picture images between the present and preceding fields is canceled.

Figure 19:
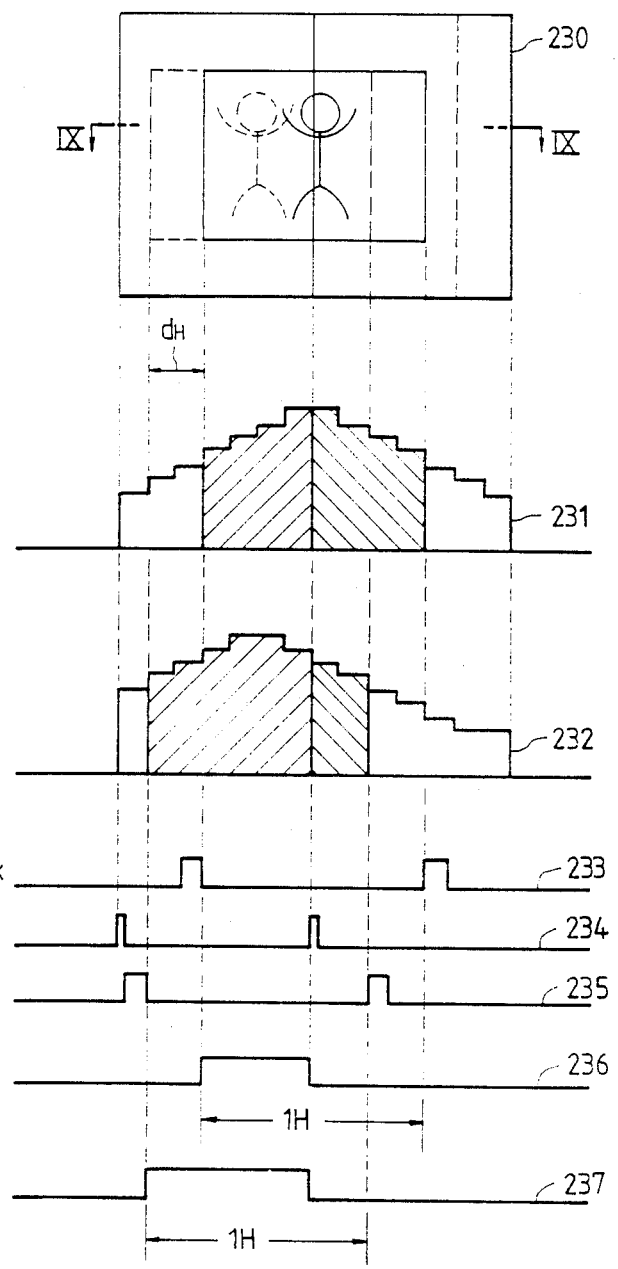

In FIG. 19, illustration 230 shows a picture image of a man projected onto the imaging device 109. The solid line image is that of the preceding field; dot line image, of the present field. This means the picture image moved on the imaging device. An image signal of the preceding field during scanning along a line IX—IX is shown in a waveform 231: that of the present field, in a waveform 232 which is shifted by dH. The waveform 234 shows the signal $S_H$; a waveform 233, the horizontal blanking signal $H_{BLK}$ of the present field; a waveform 235, the horizontal blanking signal $H_{BLK}$ of the preceding field. Here, the signal $S_H$ is assumed to be fixed (actually, variable), while these horizontal signals are relatively shifted to the signal $S_H$ (actually, fixed). As shown in the FIG. 19, the shape of the image signal of the waveform 231 extracted for horizontal scanning period (hatched portion) is the same as that of image signal of waveform 232. Therefore, movement of image due to unintentional movement of the video camera having the imaging device is cancelled. Waveforms 236, 237 show duty cycles and rise timings of the signal $S_S$ which corresponds to the waveforms 231 and 232 to be selected to reproduce.

Hereinbelow will be described an imaging apparatus of sixth embodiment according to the invention, using the CCD imaging device 109 which is capable of extracting and image of a desired area in the vertical direction as well as compensating image position in accordance with relative vertical movement of projected image thereon to the same.

Figure 14:
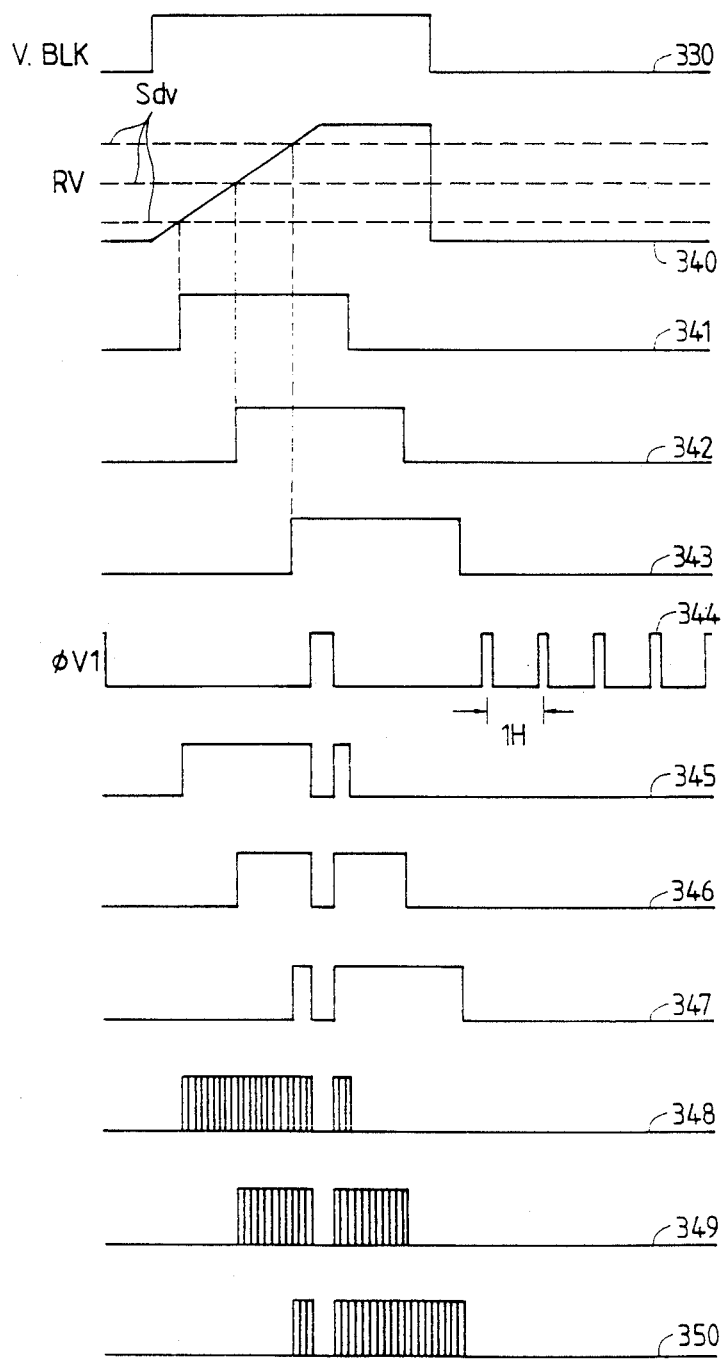
FIGS. 14, 15 show waveforms for illustrating operation of imaging apparatus shown in FIG. 11 with respect of the vertical direction.
Figure 15:
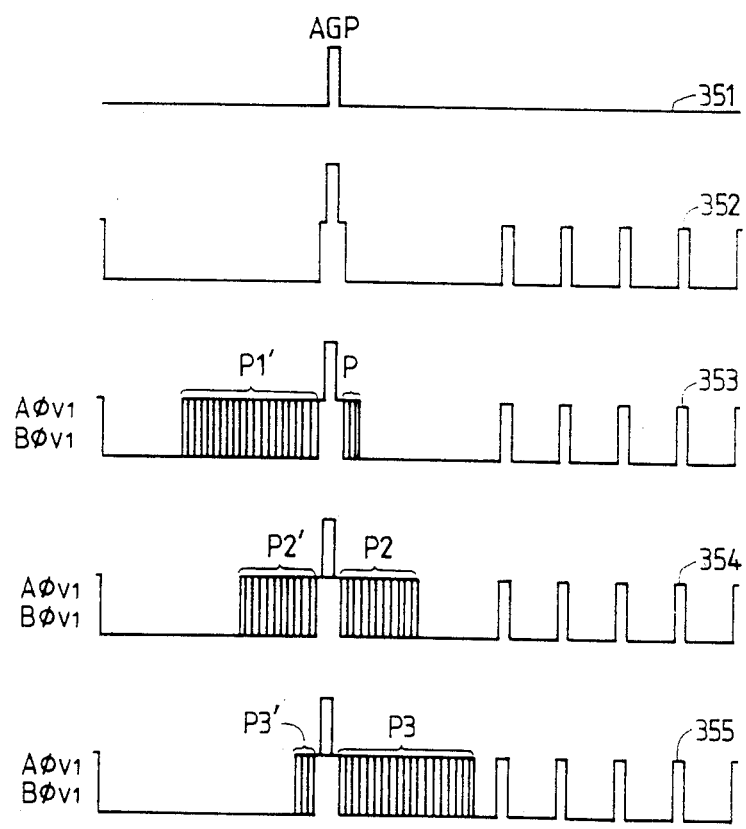

FIG. 22 is a block diagram of a control circuit 254 which is included in the drive control circuit 117 and the drive circuit 115. In FIG. 22, the vertical blanking signal $H_{BLK}$ from the camera circuit 119 is applied to a trapezoidal generator 238 which generates a reference signal RV shown by a trapezoidal waveform 340 in FIG. 14. The reference signal RV is applied to one input of a comparator 239. The vertical detection signal $S_{dV}$ is applied to another input of the comparator 239. The comparator 239 output a pulse when the reference signal is higher in level than the vertical detection signal $S_{dV}$. An output signal of the comparator 239 is sent to a monostable multivibrator 240 which generates a pulse signal with a predetermined pulse width at a timing determined by level of the vertical detection signal $S_{dV}$, as shown by waveform 341, 342, 343 depending of the level of the $S_{dV}$. The signal from the monostable multivibrator 240 is sent to one input of an AND gate 250. A standard vertical transfer signal $\Phi_{V1}$ is applied through an inverter 260 to another input of the AND gate 250. An output signal of the AND gate 250 is applied to a switch circuit 251. A high speed clock HSC which is of higher frequency than a standard vertical transfer signal $V_{\Phi 1}$ is applied to the switch circuit 251. Correspondingly with the waveforms 341, 342, 343, the switch 251 outputs waveforms 348, 349, 350 to be sent to an adder 253. The standard vertical transfer signal $\Phi_{V1}$ is applied to an adder 252. The gate pulse AGP shown as waveform 351 shown in FIG. 15 is applied to another input of the adder 252. An output signal of the adder 252 shown by waveform 352 is sent to another input of the adder 253. An output signal of the adder 253 shown by waveforms 353, 354, 355 is outputted from the vertical transfer drive circuit 115. Therefore, charges produced by photoelectric conversion elements are transferred to the vertical CCD arrays 112a, 112b. Due to the high speed clock HSC, the vertical transfer CCD arrays 112a, 112b transfer charges at a higher speed after the gate pulse AGP arises for time periods p1, p2, p3 determined by the level of the vertical detection signal $S_{dV}$. Accordingly, for time periods p1, p2, p3 the vertical transfer CCD arrays 112a, 112b transfer undesired picture signal charge at a high speed for disposal, then transferring signal charges at a standard speed. Therefore, the above-mentioned imaging apparatus of this embodiment can extract a part of image from the detected image in vertical direction. The position of the extracted image is determined by the vertical detection signal $S_{dV}$. Remaining charges are transferred at a high speed for time periods p1', p2', p3'. In addition to this, it can cancel movement of the projected image between successive field by movement detector 118, in a vertical direction.

Figure 17:
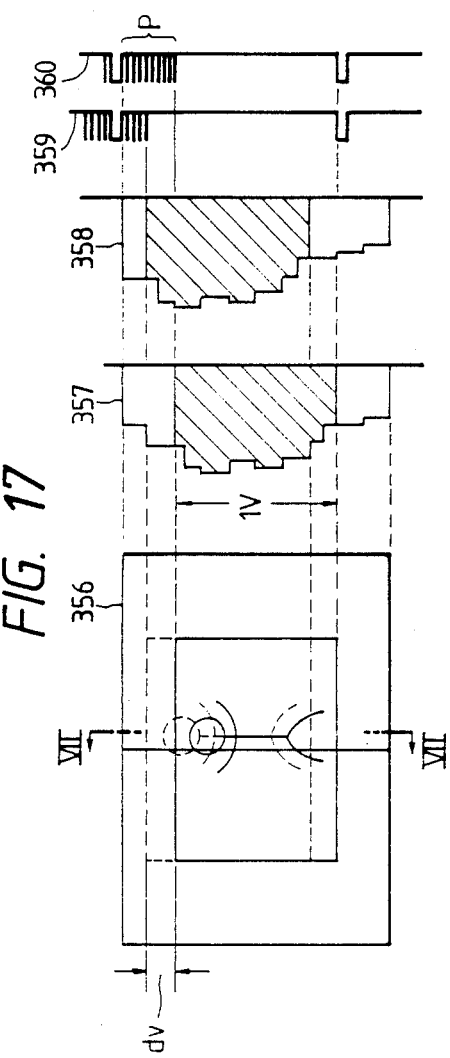
FIG. 17 illustrates operation in canceling of movement of image.

In FIG. 17, illustration 356 shows a picture image of a man projected onto the imaging device 109. The solid line image is that of the preceding field; dot line image, of the present field. This means the picture image moved on the imaging device. A image signal of the preceding field during scanning along a line VII—VII is shown in a waveform 357; that of the present field, in a waveform 358. The waveform 359 shows the vertical transfer signals $A\Phi_{1v}$, $A\Phi_{2v}$ of the present field; a waveform 360, the vertical transfer signals $A\Phi_{1V}$, $A\Phi_{2V}$ of the preceding field. Therefore, undesired picture image signal charges are transferred at a high speed. Then, desired picture image signal charges is transferred at a standard speed to the horizontal CCD arrays 114a, 114b. As shown in FIG. 17, the shape of the image signal of waveform 357 extracted for vertical scanning period (hatched portion) is the same as that of image signal of waveform 358. This means movement of image is cancelled. Moreover, an additional initialize means may be provided on and along the upper end of vertical CCDs 113a, 113b which acts as an electronic shutter.

Hereinbelow will be described a seventh embodiment according to the invention with reference to FIGS. 1, 2, 4, 11, 16.

An imaging apparatus has the movement detection circuit 118 in addition to the structure of the second embodiment together with the control circuit 254. The output signals of the movement detector 118 are obtained as the output signal $S_{dV}$, $S_{dH}$ of the field correlation detectors 122a, 122b. The signals $S_{dV}$, $S_{dH}$ are sent to the data latch 36 through an unshown lock-up ROM table. The gate pulse 25, vertical transfer signal $\Phi_{V1}$, $\Phi_{V2}$ are supplied by the drive control circuit 115 to the interline CCD 10. Therefore, the imaging apparatus of the seventh embodiment can extract a desired picture image from the larger size image plane with movement of the projected image onto the interline CCD 10 between the present field and preceding field cancelled.

Figure 21:
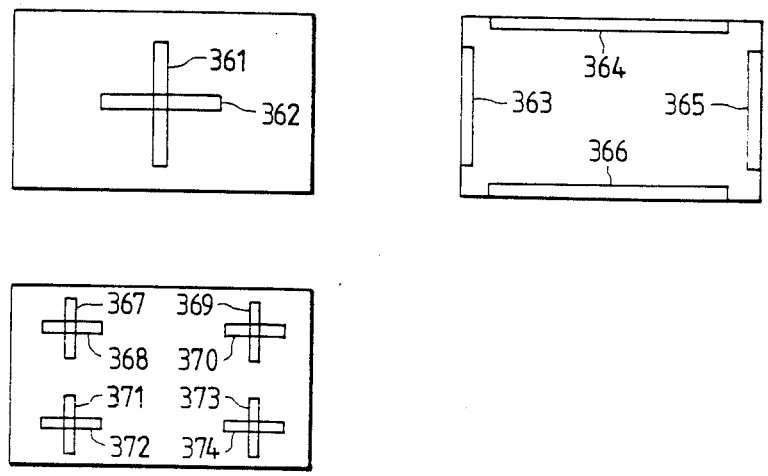
FIG. 21 shows an illustration of sensor arrangement of the movement detector shown in FIG. 11.

In the above-mentiond embodiments, movement detection is performed by using line sensors 120, 121 of FIG. 16. However, an accelometer may be used. Movement detection is performed based on detected acceleration and focal distance "f" of object lens system for projecting picture image onto the above-mentioned imaging devices 10, 109. Moreover, the line sensors 120, 121 can be substituted by an unshown data latching means which latches the image signal of the bar portions of the imaging devices 10, 109, as shown in FIG. 21 in which 361, 363, 365, 367, 369, 371, 373 are used as vertical line sensors, and 362, 364, 366, 368, 370, 372, 374 are used as horizontal line sensors both arranged within the imaging devices 10, 109 as illustrated. The latching means sends data to the field correlation detectors 122a, 122b.

The technique described in the second and fourth embodiments, i.e., extracting a partial image from detected image with position thereof controlled also applies to other image processing, such as electronic panning, electronic zooming. Electronic panning is such that picture image moves on a display without moving a camera. It is performed by continuously changing position of the extracting image. Electronic zooming is performed by changing area size of extracting image without changing displaying area size. Therefore, controlling extracting position of image is required.

In the above-mentioned embodiments using a movement detector, movement detection cancel means may be further provided for cancelling of movement detection when a movement higher than a predetermined level is detected, i.e., panning (intentionaly moving a camera) is detected.

The above-described embodiments are just examples of the present invention, and therefore, it will be apparent for those skilled in the art that many modifications and variations may be made without departing from the scope of the present invention.

What is claimed is:

1. An imaging device comprising:
   (a) plural vertical CCDs arranged in main scanning direction;
   (b) photoelectic conversion elements arranged along each of said plural vertical CCDs;
   (c) transfer means for transferring charges generated in each of said photoelectric conversion elements to said plural vertical CCDs in response to a vertical blanking signal;
   (d) a first horizontal CCD arranged along an end of said plural vertical CCDs for receiving said charges from said plural vertical CCDs in response to a first signal and for transferring said charges in said main scanning direction in response to a second signal;
   (e) a second horizontal CCD interposed between said plural vertical CCDs and said first horizontal CCD for receiving said charges from said plural vertical CCDs in response to a first signal and for transferring said charges in said main scanning direction in response to a third signal; and
   (f) initializing means having an electrode maintained at a constant potential, said electrode being arranged along said first horizontal CCD for intializing said first horizontal CCD by transferring said charges existing in said first horizontal CCD in response to a first signal directly to said electrode such that each charge is shifted from said first horizontal CCD to an adjcent portion of said electrode at once.

2. An imaging apparatus having said imaging device according to claim 1, further comprising:
   a drive circuit for producing said first, second, and third signals in response to a horizontal blanking signal; and
   means for controlling starting and ending timings of transferring said charges by said third signal in accordance with an external signal.

3. An imaging apparatus according to claim 2, further comprising:
   a first movement detector for detecting movement amount of picture image projected onto said imaging device relative to said imaging device in the horizontal direction over a scanning cycle of said plural vertical CCD, a detection signal thereof being applied to said drive circuit as said external signal.

4. An imaging apparatus as claimed in claim 3, wherein said first movement detector is a field correlation detecting means.

5. An imaging apparatus according to claim 2, further comprising:
   a second drive circuit responsive to said horizontal blanking signal for producing a drive signal applied to said plural vertical CCD;
   means for producing a high speed transfer signal in response to a vertical blanking signal for a period of time between said vertical blanking signal and a first horizontal blanking signal which follows said vertical blanking signal, said high speed transfer signal being applied to said horizontal CCDs of said imaging device; and
   means for controlling duration of said high speed transfer signal in accordance with a second external signal.

6. An imaging apparatus according to claim 5, further comprising:
   a first movement detector for detecting the amount of movement of a picture image projected onto said imaging device relative to said imaging device in vertical direction over said vertical blanking interval, detection signal thereof being applied to said second drive circuit as said second external signal.

7. An imaging apparatus as claimed in claim 6, wherein said first movement detector is a field correlation detecting means.

8. An imaging device comprising:

first and second CCD imagers arranged side by side in a main scanning direction for receiving an image by an area formed of said first and second CCD imagers, said first and second imagers being responsive to two different driving signals to respectively produce first and second output video signals each indicative of an image made on photoelectric conversion surface thereof, each of said first and second imagers having plural vertical CCDs arranged in said main scanning direction at a given pitch, end vertical CCDs of said first and second imagers, adjacent to each other being arranged at said given pitch, charges produced by said photoelectric conversion surface being transferred in response to a vertical blanking signal.

9. An imaging apparatus as claimed in claim 8, wherein said first and second imagers are formed on a semiconductor substrate.

10. An imaging apparatus comprising:
(a) first and second CCD imagers arranged in a main scanning direction, said first and second imagers responsive to two different driving signals to respectively produce first and second output video signals each indicative of an image made on a photoelectric conversion surface thereof, each of said first and second imagers having plural vertical CCDs arranged in said main scanning direction, charges produced by said photoelectric conversion surface being transferred in response to a vertical blanking signal;
(b) a variable delay timer responsive to a horizontal blanking signal, the delay time thereof being determined by an external signal;
(c) a timing generator responsive to said output signal of said variable delay timer for producing a first signal for a first predetermined time period and a second signal for a second predetermined time period immediately after said first predetermined time period;
(d) a first drive circuit responsive to said first signal for producing a first drive signal applied to a horizontal CCD of said first imager for said first predetermined time period;
(e) a second drive circuit responsive to said second signal for producing a second drive signal applied to a horizontal CCD of said second imager for said second predetermined time period;
(f) switch means for transferring first and second output video signals for a scanning period between two consecutive horizontal blanking signals, the sum of said first and second predetermined time periods being longer than one horizontal blanking interval of said horizontal blanking signal so that said first and second output video signals are outputted from said first and second imagers over a period of time longer than one horizontal blanking interval;
(g) a first vertical drive circuit responsive to said first signal for producing a first vertical drive signal for said plural vertical CCDs of said second imager; and
(h) a second vertical drive circuit responsive to said second signal for producing a second vertical drive signal for said plural vertical CCDs of said first imager.

11. An imaging apparatus according to claim 10, further comprising:

a first movement detector for detecting movement amount of picture image projected onto said imaging device relative to said imaging device in the horizontal direction over a scanning cycle of said plural vertical CCD, a detection signal thereof being applied to said variable delay timer as said external signal.

12. An imaging apparatus as claimed in claim 11, wherein said first movement detector is a field correlation detecting means.

13. An imaging apparatus according to claim 10, wherein said first and second vertical drive circuits further comprising means for producing first and second high speed transfer signals respectively in response to a vertical blanking signal for a period of time between said vertical blanking signal and a first horizontal blanking signal which follows said vertical blanking signal, said first and second high speed transfer signals being applied to said horizontal CCDs of said first and second imagers respectively, and means for controlling duration of said first and second high speed transfer signals in accordance with a second external signal.

14. An imaging apparatus according claim 13, further comprising:
a first movement detector for detecting movemet amount of picture image projected onto said imaging device relative to said imaging device in vertical direction over a scanning cycle of said plural vertical CCD, detection signal thereof being applied to said first and second drive circuits as said second external signal.

15. An imaging apparatus as claimed in claim 14, wherein said first movement detector is a field correlation detecting means.

16. An imaging apparatus comprising:
(a) first and second CCD imagers arranged side by side in a main scanning direction for receiving an image by an area formed of said first and second CCD imagers, said first and second imagers being responsive to two different driving signals to respectively produce first and second output video signals each indicative of an image made on photoelectric conversion surface thereof, each of said first and second imagers having plural vertical CCDs arranged in said main scanning direction at a given pitch, end vertical CCDs of said first and second imagers, adjacent to each other being arranged at said given pitch, charges produced by said photoelectric conversion surface being transferred in response to a vertical blanking signal;
(b) a variable delay timer responsive to a horizontal blanking signal, the delay time thereof being determined by an external signal;
(c) a timing generator responsive to said output signal of said variable delay timer for producing a first signal for a first predetermined time period and a second signal for a second predetermined time period immediately after said first predetermined time period;
(d) a first drive circuit responsive to said first signal for producing a first drive signal applied to a horitonal CCD of said first imager for said first predetermined time period;
(e) a second drive circuit responsive to said second signal for producing a second drive signal applied to a horizontal CCD of said second imager for said second predetermined time period;

(f) switch means for transferring first and second output video signals for a scanning period between two consecutive horizontal blanking signals, the sum of said first and second predetermined time periods being longer than one horizontal blanking interval of said horizontal blanking signal so that said first and second output video signals are outputted from said first and second imagers over a period of time longer than one horizontal blanking interval;

(g) a first vertical drive circuit responsive to said first signal for producing a first vertical drive signal for said plural vertical CCDs of said second imager; and (h) a second vertical drive circuit responsive to said second signal for producing a second vertical drive signal for said plural vertical CCDs of said first imager.

* * * * *